(12) United States Patent
Field

(10) Patent No.: US 7,225,836 B2
(45) Date of Patent: *Jun. 5, 2007

(54) PIPE PLUG

(76) Inventor: William Field, 7567 W. Sunrise Blvd., Plantation, FL (US) 33313

( * ) Notice: Subject to any disclaimer, the term of this patent is extended or adjusted under 35 U.S.C. 154(b) by 0 days.

This patent is subject to a terminal disclaimer.

(21) Appl. No.: 11/271,120

(22) Filed: Nov. 12, 2005

(65) Prior Publication Data

US 2006/0225801 A1    Oct. 12, 2006

Related U.S. Application Data

(63) Continuation of application No. 11/103,214, filed on Apr. 11, 2005, now Pat. No. 6,966,343.

(51) Int. Cl.
*F16L 55/10*    (2006.01)
(52) U.S. Cl. .............................. 138/89; 138/90; 138/93
(58) Field of Classification Search .................. 138/89, 138/90, 93
See application file for complete search history.

(56) References Cited

U.S. PATENT DOCUMENTS

| | | | |
|---|---|---|---|
| 2,607,370 A | 8/1952 | Anderson | |
| 2,974,685 A | 3/1961 | Ver Nooy | |
| 3,561,490 A | 2/1971 | Little | |
| 3,693,408 A * | 9/1972 | Hyde | 73/49.8 |
| 4,385,643 A | 5/1983 | Noe | |
| 4,465,104 A * | 8/1984 | Wittman et al. | 138/89 |
| 4,474,216 A | 10/1984 | Noe | |
| 4,574,618 A | 3/1986 | Anthony et al. | |
| 4,658,860 A * | 4/1987 | Reaux | 138/89 |
| 4,760,868 A | 8/1988 | Saxon | |
| 5,076,095 A | 12/1991 | Erhardt | |
| 5,119,861 A | 6/1992 | Pino | |
| 5,421,358 A | 6/1995 | Jaeger | |
| 5,797,431 A | 8/1998 | Adams | |
| 6,062,262 A | 5/2000 | Tash | |
| 6,170,530 B1 | 1/2001 | Steblina | |
| 6,481,465 B1 | 11/2002 | Warmerdam | |
| 6,601,437 B2 | 8/2003 | Gotowik | |
| 6,966,343 B1 * | 11/2005 | Field | 138/89 |
| 2005/0241710 A1 * | 11/2005 | Early et al. | 138/89 |

* cited by examiner

*Primary Examiner*—James Hook
(74) *Attorney, Agent, or Firm*—Mark D. Bowen, Esq.; Stearns Weaver Miller Weissler Alhadeff & Sitterson P.A.

(57) ABSTRACT

A pipe plug apparatus configured for insertion into a section of pipe and adapted to radially expand so as to engage the inner surface of the pipe and form a positive seal therewith. The pipe plug is preferably configurable from a non-sealing configuration wherein radially expandable seals are relaxed by application of pressure from a compressed fluid, to a spring biased sealing configuration automatically upon release of the pressure. A positive seal is automatically formed and maintained by spring biased axial compression.

4 Claims, 6 Drawing Sheets

PIPE PLUG

CROSS REFERENCE TO RELATED APPLICATIONS

This application is a continuation of U.S. patent application Ser. No. 11/103,214, filed Apr. 11, 2005 now U.S. Pat. No. 6,966,343.

BACKGROUND OF THE INVENTION

1. Field of the Invention

The present invention relates to pipe leak testing equipment, and more particularly to a pipe plug for testing piping systems for fluid integrity.

2. Description of Related Art

Piping systems are typically constructed by connecting sections of pipe with fittings, valves, and other accessories. It is customary for pipe systems to be pressure tested for leaks prior to entering service. Such tests require that the pipe system, or a section thereof, be pressurized and inspected for leaks. In addition, it is often necessary to isolate a section of pipe for various reasons. For example, maintenance matters and safety considerations often require that a particular section of pipe connected to a system be isolated from the rest of the system while work is being performed.

U.S. Pat. No. 2,607,370 to Anderson (1948), discloses a pipe plug for sealing the ends of pipes wherein a cam lever is used to radially expand a seal. U.S. Pat. No. 2,974,685 to Nooy (1961), discloses a pipe plug with a sealing arrangement combined with an expansible locking arrangement in a manner such that rotation of a wing nut generates compressive force that expands a seal while also expanding a locking mechanism. U.S. Pat. No. 3,561,490 to Little (1971) discloses a pipeline testing apparatus that relies on upstream pressure to activate an internal mechanism that plugs the pipe. U.S. Pat. No. 4,385,643 to Noe (1983), discloses a pipe plug designed wherein a plurality of jaws are independently engaged with the body for movement along the ramp surface to cause the jaws to extend and grip the inside surface of the pipe. U.S. Pat. No. 4,574,618 to Anthony et al. (1986), discloses a pipe that relies on a fluidic mechanical actuator to generate a axial compression thereby causing one or more seals to expand radially when subjected to an axial force. U.S. Pat. No. 4,760,868 to Saxon (1988), discloses a pipe plug device wherein rotation of a threaded nut creates an axial compressive force to form a seal by radial expansion of first and second fluid seals. U.S. Pat. No. 5,797,431 to Adams (1998), discloses a pipe plug wherein rotation of a threaded nut causes axial compression and radial expansion of the seal, and a helical spring assists in relaxing the seal.

While the pipe plugs disclosed in the background art have proven somewhat effective in providing devices capable of sealing a pipe there remain a number of limitations and disadvantages in the art. One such disadvantage relates to the axial compression methods and mechanisms employed to form a radially expanding seal. More particularly, requiring the user to manipulate or rotate a threaded nut to provide axial compression for the purpose of radially expanding a resilient seal is considered particularly undesirable as access to the inserted pipe plug is often difficult due to space limitations and/or the orientation of the inserted pipe plug.

Accordingly, there exists a need for an easy to install pipe test plug for temporarily isolating piping systems during testing, repair and maintenance, for bypassing of damaged lines, and for isolating piping systems during construction. More particularly, there exists a need for a pipe plug apparatus configured-for-insertion-into a-section of pipe and adapted to radially expand so as to engage the inner surface of the pipe and form a positive seal therewith. There further exists a need for such a device wherein the seal is formed without requiring the user to manually rotate a threaded nut or actuate a mechanical lever.

BRIEF SUMMARY OF THE INVENTION

The present invention addresses the needs in the art by providing a pipe plug apparatus configured for insertion into a section of pipe and adapted to radially expand so as to engage the inner surface of the pipe and form a positive seal therewith. A pipe plug in accordance with the present invention is preferably configurable from a non-sealing configuration wherein radailly expandable seals are relaxed by application of pressure from a compressed fluid, to a spring biased sealing configuration automatically upon release of the pressure. Accordingly, a positive seal is automatically formed and maintained by spring biased axial compression.

Accordingly, it is an object of the present invention to provide a pipe plug leak detection apparatus.

Another object of the present invention is to provide a pipe plug apparatus configured for insertion into a section of pipe and adapted for automatic radial expansion to form a seal upon release of previously applied pressure.

In accordance with these and other objects, which will become apparent hereinafter, the instant invention will now be described with particular reference to the accompanying drawings.

DETAILED DESCRIPTION OF THE INVENTION

With reference now to the drawings FIGS. 1–6 depict a pipe plug apparatus, generally referenced as 10, for use in leak detection and isolation of sections of pipe. Pipe plug apparatus 10 is adapted for axial insertion within a section of tube or pipe and adapted upon triggering to form a seal by spring biased axial compression to effect radial expansion of resilient sealing members to form a positive seal with the inner surface of the tube or pipe. Spring biasing maintains the seal until application of pressure from a compressed fluid source acts on a spring biased piston thereby relaxing the sealing members.

Figure 1:
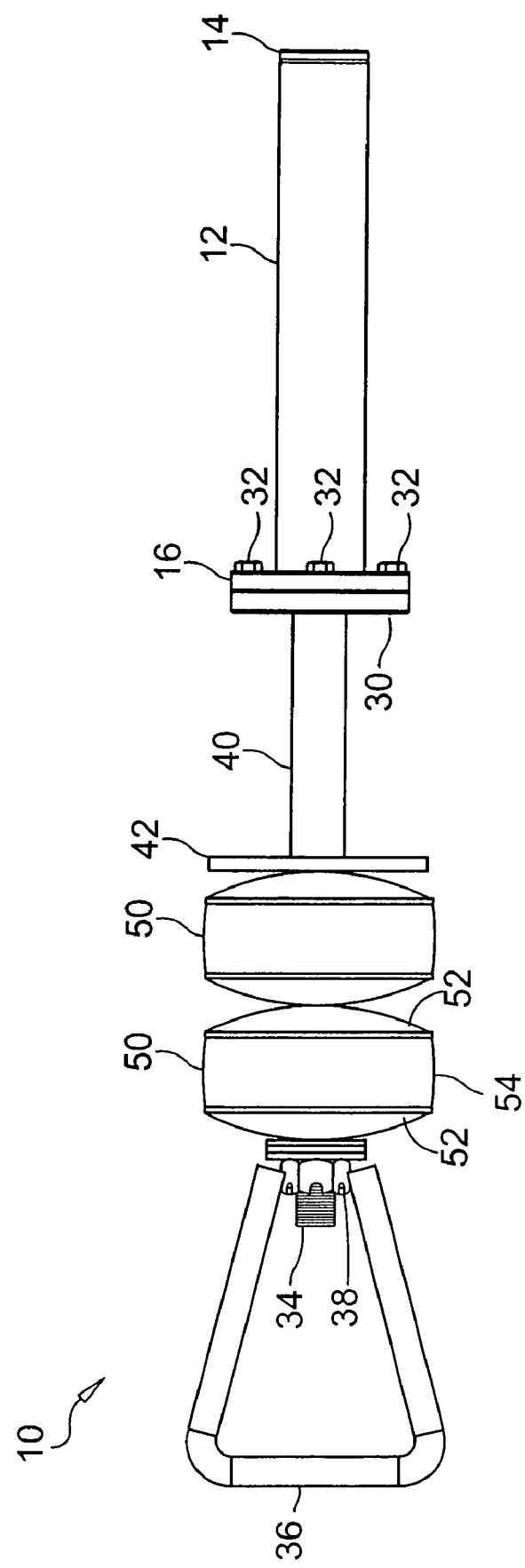
FIG. 1 is a side view of a pipe plug in accordance with the present invention.
Figure 2:
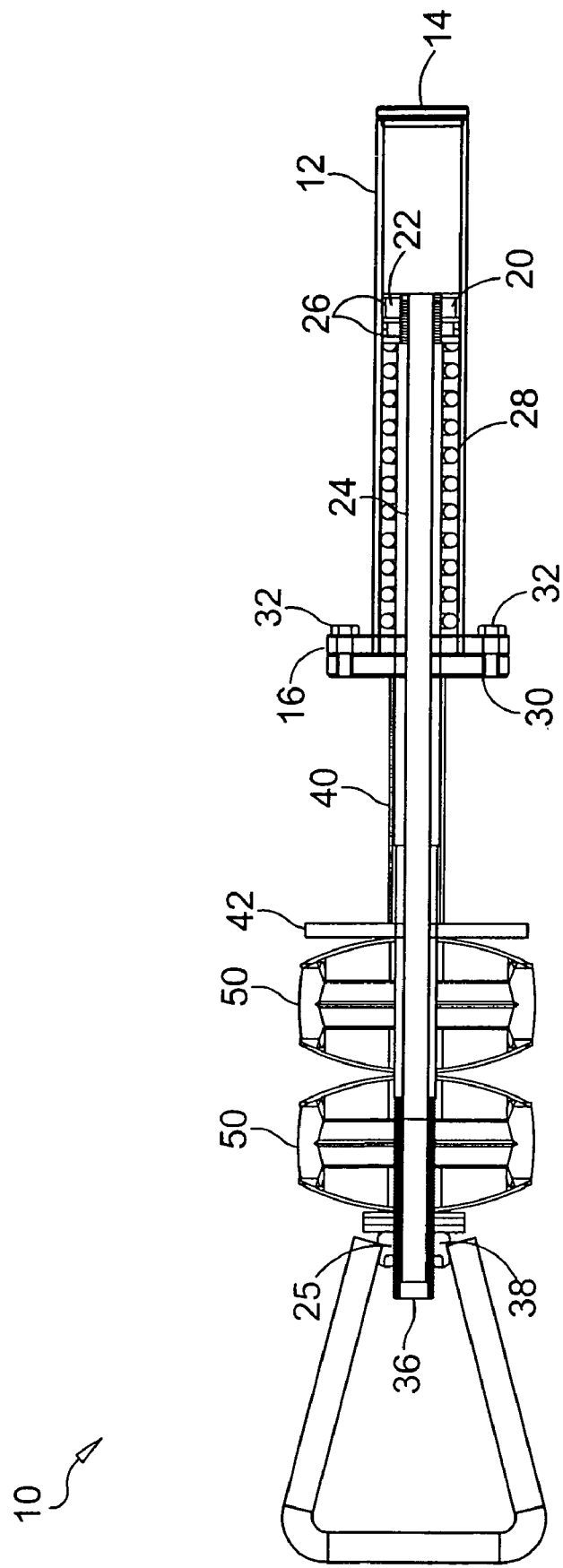
FIG. 2 is a sectional view thereof taken along section line 2—2 of in FIG. 1.
Figure 3:
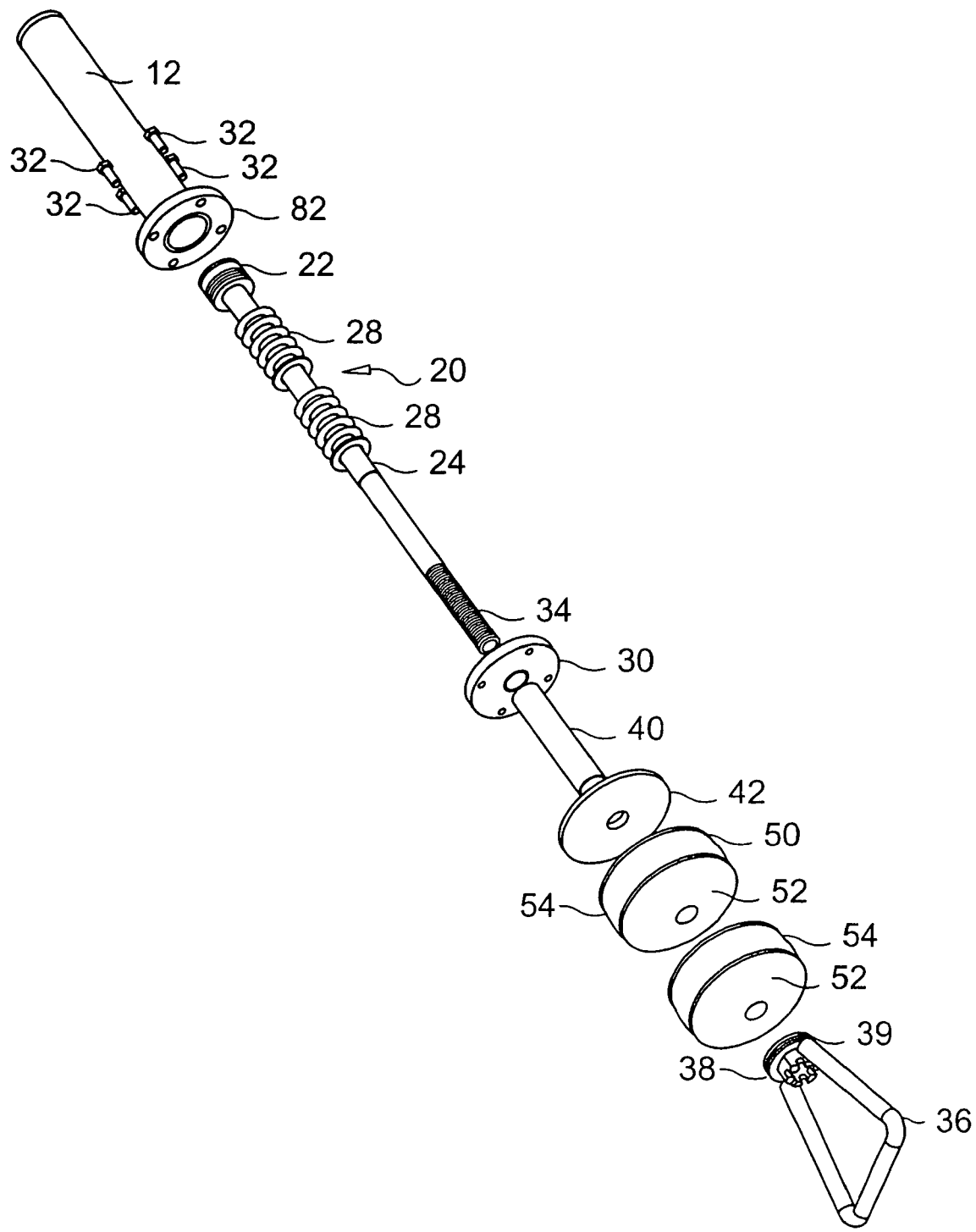
FIG. 3 is an exploded view thereof.
Figure 4:
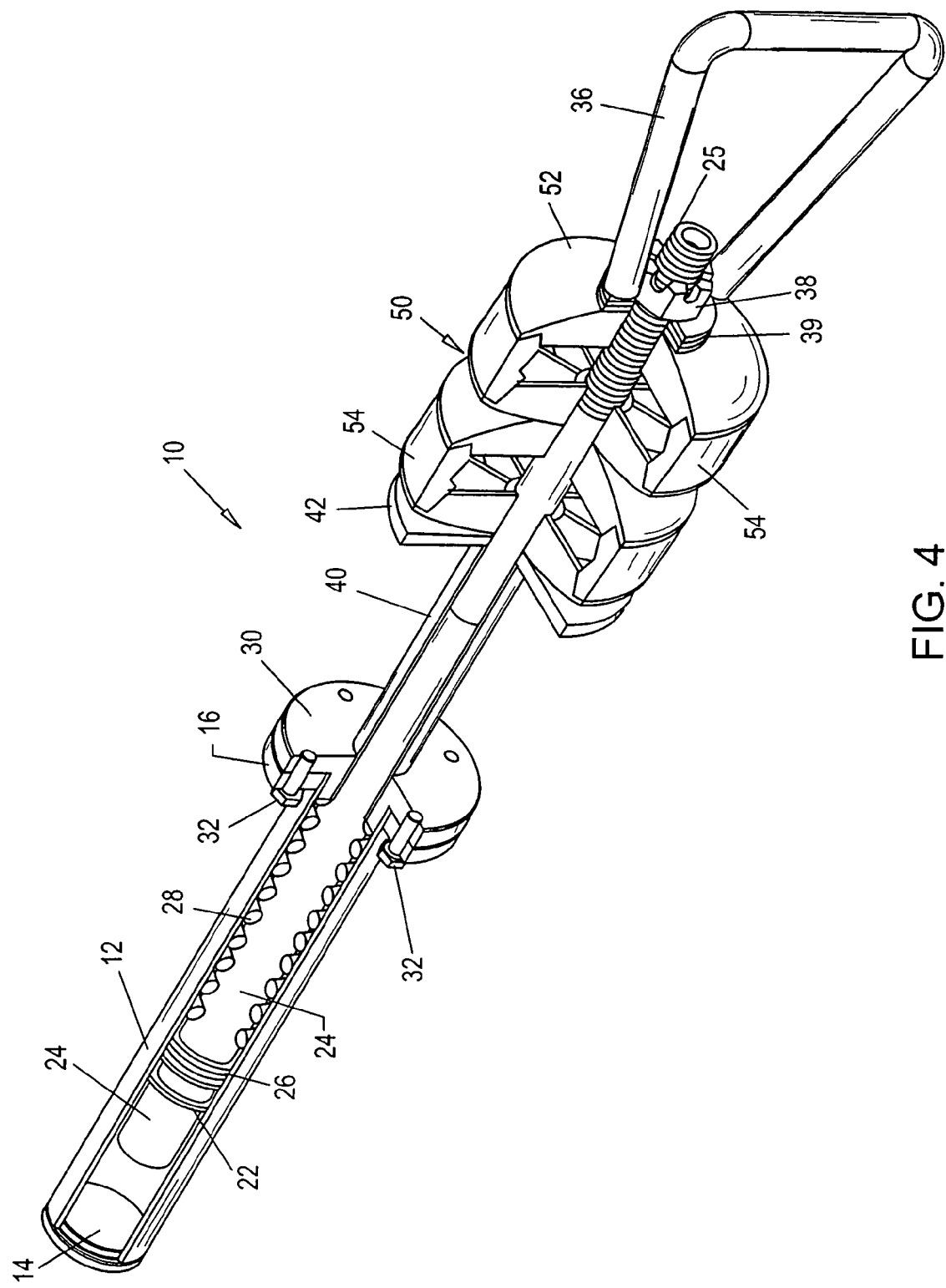
FIG. 4 is a perspective view thereof depicted in quarter section.

FIG. 1 shows a side view of pipe plug 10, and FIG. 2 shows a sectional view thereof. Pipe plug 10 includes a cylinder 12 having a closed end 14 and an open end terminating in a flange 16. Cylinder 12 is preferably formed of steel pipe, however, any suitable material capable of withstanding internal pressure is suitable. Cylinder 12 receives a piston assembly, generally referenced as 20, axially slidable insertion therein. Piston assembly 20 includes a piston head 22 and hollow tubular rod 24 connected to piston head 22. Piston head 22 includes circumferential sealing rings 26 for providing a positive seal with the inner wall of cylinder 12. In addition, piston head 22 defines an axial through bore for inserted connection of the end of tubular rod 24 so as to allow for fluid flow through the piston assembly into the cylinder volume disposed between the cylinder closed end 14 and piston head 22 as further discussed herein. Piston assembly 20 is biased toward the closed end 14 of cylinder 12 by one or more helical springs 28 concentrically disposed relative to hollow tubular rod 24. Helical springs 28 are sized and selected such that opposing ends thereof bear against piston head 22 on one end, and against a cylinder cap 30 securely fastened to cylinder flange 16 on the other end as best seen in FIGS. 2 and 3. Cylinder cap 30 is preferably securely fastened to flange 16 by threaded fasteners 32, however, any suitable fastening structure is considered within the scope of the present invention.

A sleeve 40 and generally cylindrical rigid plate 42 are disposed concentrically over hollow tubular rod 24 as seen in FIGS. 1 and 2, and as best shown in FIG. 3. Sleeve 40 functions to maintain rigid plate 42 in spaced relation with cylinder 12 as the piston assembly, and particularly hollow rod 24, slide axially relative thereto. Hollow tubular rod 24 extends axially and terminates in an externally threaded end portion 25. End portion 25 is adapted for connection to a compressed fluid source by a pressure fitting 27. Pressure fitting 27 facilitates connection of a pressurized fluid source, such as pressurized liquid oil or compressed air to apparatus 10. Once connected, the pressurized fluid is in fluid communication with the bottom of cylinder 12 via hollow rod 24. A handle 36 having an internally threaded connecting nut 38 is in threaded engagement with end portion 25 of tubular rod 24 to facilitate fine axial adjustment as further discussed below. Accordingly, handle 36 may be connected to hollow rod 24 by threaded engagement, and selectively removed therefrom by simple rotation of handle 36.

One or more radially expandable sealing members, generally referenced as 50, are mounted on hollow rod 24 disposed between rigid plate 42 and handle 36. A plurality of washers 39 are preferably disposed between internally threaded nut 38 and sealing member 50. Each radially expandable sealing member includes rigid opposing end members, referenced as 52, disposed in face-to-face relation, and a resilient circumferential core 54 sandwiched therebetween. Each rigid end member defines an axial through bore sized to receive a portion of hollow rod 24 inserted therethrough. The application of an axial compressive force to end members 52 moves opposing end members closer together and results in a bulging radial expansion of resilient core 54. In a preferred embodiment, the user is provided with a variety of sealing members of differing radial diameters (e.g. 4", 6", 8" etc.) to allow for use of the pipe plug to seal pipes of various diameters.

Figure 5:
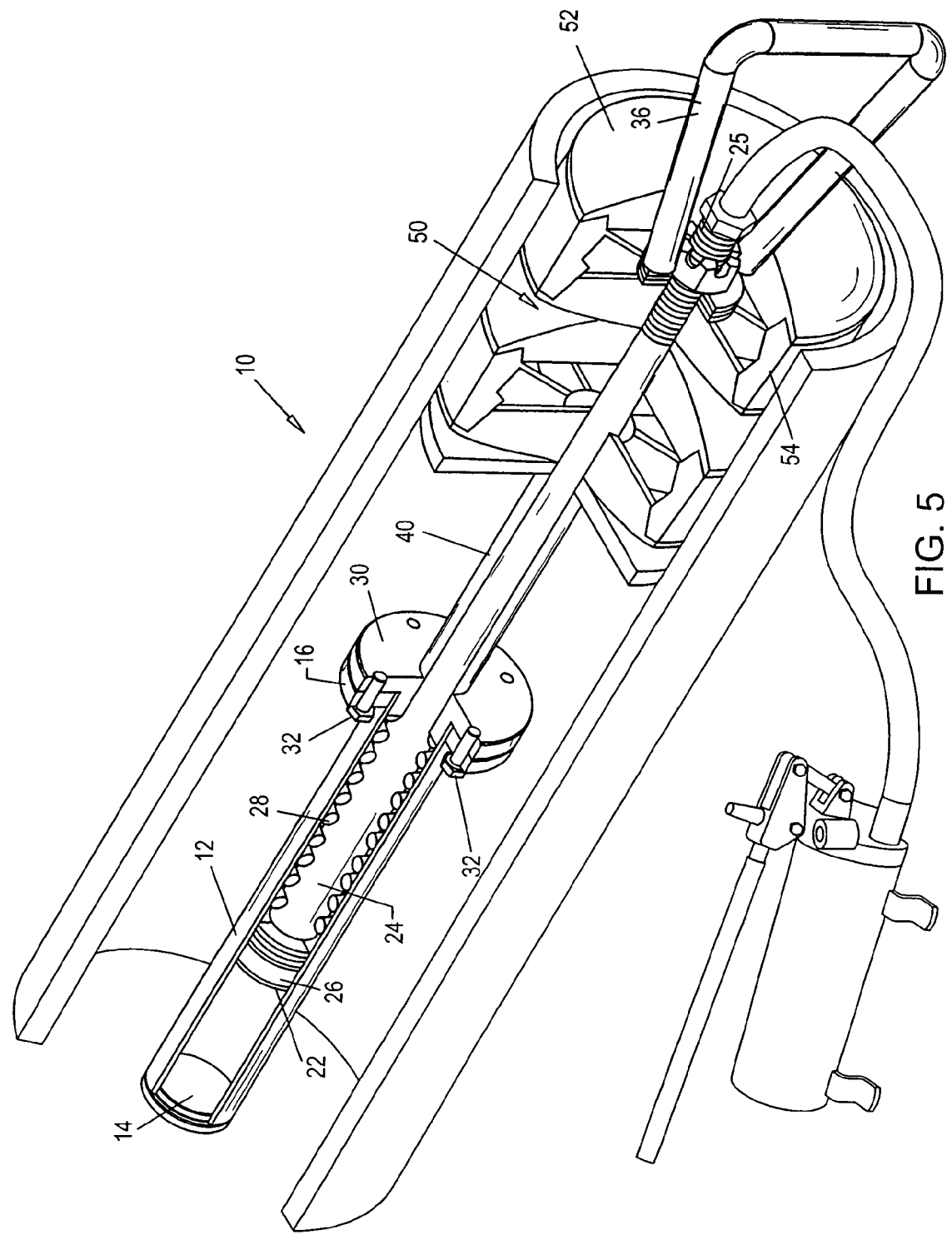
FIG. 5 shows the pipe plug inserted within a pipe prior to sealing engagement.
Figure 6:
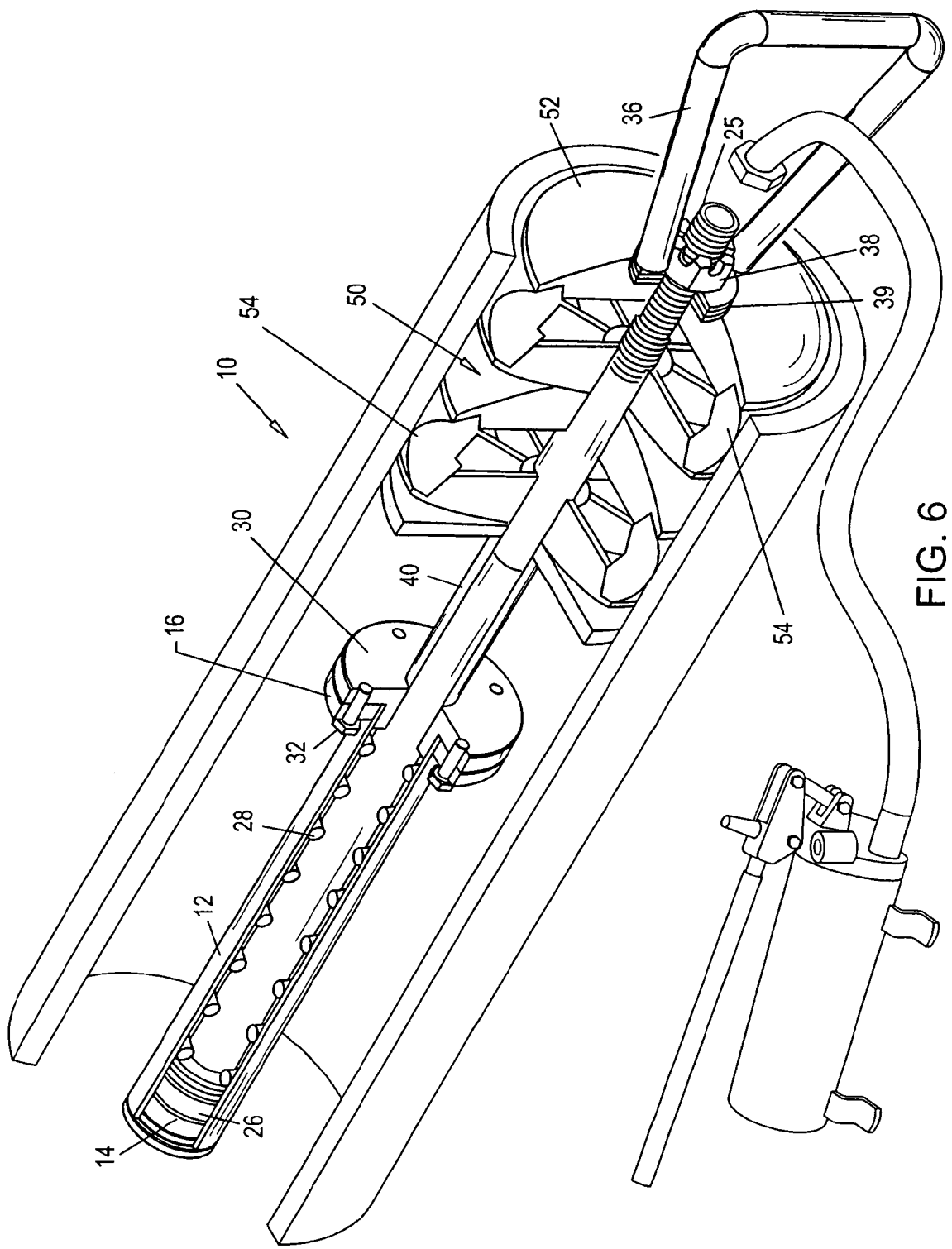
FIG. 6 shows the pipe plug inserted within a pipe in sealing engagement.

As best illustrated in FIGS. 5 and 6, pipe plug apparatus 10 is employed by first selecting and mounting suitably sized radially expanding sealing members 50 onto hollow tube 24 and reinstalling handle 36. As noted above, radially expanding sealing members of various sizes may be provided to allow the pipe plug apparatus to be adapted for use with pipes ranging in diameter from 4" on up. Next, a source of pressurized fluid is connected to the end portion 25 of hollow rod 24. The source of pressurized fluid may be any suitable source including a manual or electric hydraulic pump or pressurized air source. The application of pressure to hollow rod 24 places the cylinder volume disposed between the cylinder closed end 14 and piston head 22 under pressure thereby causing the cylinder to overcome the force applied by spring 28 and move so as to allow for separation of plates 42 and 39 to relax the radially expandable sealing members 50. Once the sealing members are relaxed in a radially compact configuration, pipe plug 10 is then axially inserted into a section of pipe as depicted in FIG. 5. Once installed within the pipe the previously applied fluid pressure is reduced whereby spring 28 urges the piston assembly (including hollow rod 24 and piston head 22) toward the closed end 14 of the cylinder thereby axially compressing sealing members 50 between plates 39 and 42 such that the sealing members radially expand into sealing contact with the inner pipe wall as best depicted in FIG. 6. Accordingly, a positive seal is automatically formed and maintained by spring biased axial compression. As should be apparent, spring 28 maintains the sealing members in the sealing configuration by spring generated axial compression until removal of the pipe plug is desired at which time fluid pressure is again applied to drive the piston and relax the sealing members.

In an alternate embodiment the combination of spring force and fluid pressure to compress the spring as disclosed herein may be adapted to function as a spring lifting jack. More particularly, the present invention may be utilized in lifting applications wherein a pressurized fluid is used to relax the jack such that an object may be suitably placed thereon, or in appropriate relation thereto, such that the release of pressure causes spring force to lift the object. As should be apparent, this lifting embodiment may be configured to lift an object from either below or above. As should be apparent, multiple lifting jacks may be employed as needed.

The instant invention has been shown and described herein in what is considered to be the most practical and preferred embodiment. It is recognized, however, that departures may be made therefrom within the scope of the invention and that obvious modifications will occur to a person skilled in the art.

I claim:

1. A pipe plug apparatus for insertion and selective sealing engagement with the inner wall of a section of pipe, said apparatus comprising:

an elongate body;

first and second compression plates radially projecting relative to said body;

at least one sealing member disposed between said first and second compression plates, said sealing member adapted to radially expand under axial compression;

means for biasing said compression plates axially toward one another;

means for negating said means for biasing upon application of fluid pressure;

whereby application of fluid pressure negates said means for biasing thereby radially relaxing said at least one sealing member, and the release of said fluid pressure results in radial expansion of said at least one sealing member.

2. A pipe plug apparatus according to claim 1, wherein said means for biasing said compression plates comprises a spring.

3. A pipe plug apparatus according to claim 1, wherein said means for negating said means for biasing upon application of fluid pressure comprises applying a pressurized fluid using a pump.

4. A pipe plug apparatus according to claim 3, wherein said pump comprises an air compressor.

* * * * *